Figure 1:
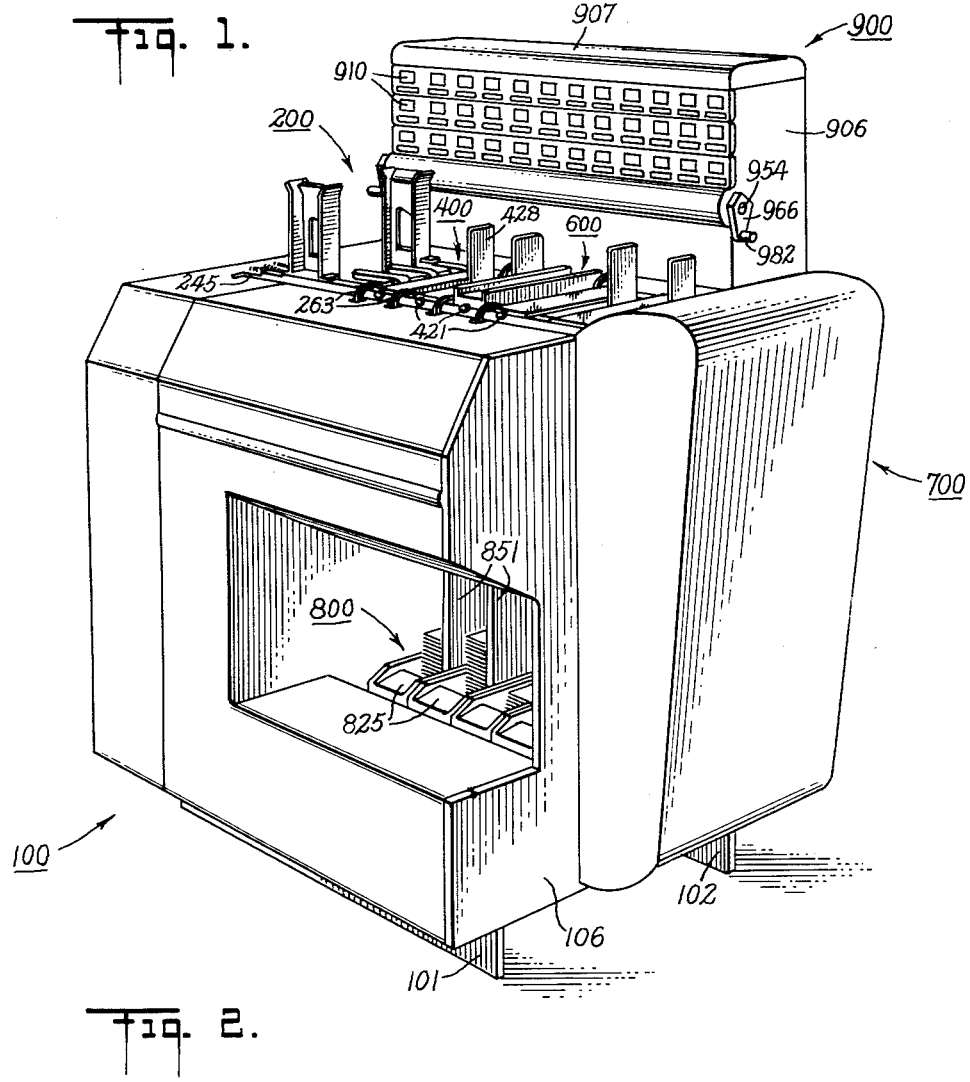

Sept. 14, 1965 W. F. HUCK ETAL 3,206,112
PUNCHING MECHANISM FOR RECORD PROCESSING MACHINE
Original Filed Jan. 4, 1957 17 Sheets-Sheet 1

INVENTORS
WILLIAM F. HUCK
G. HAMLIN LEONARD
BY
*Curtis, Morris + Safford*
ATTORNEYS

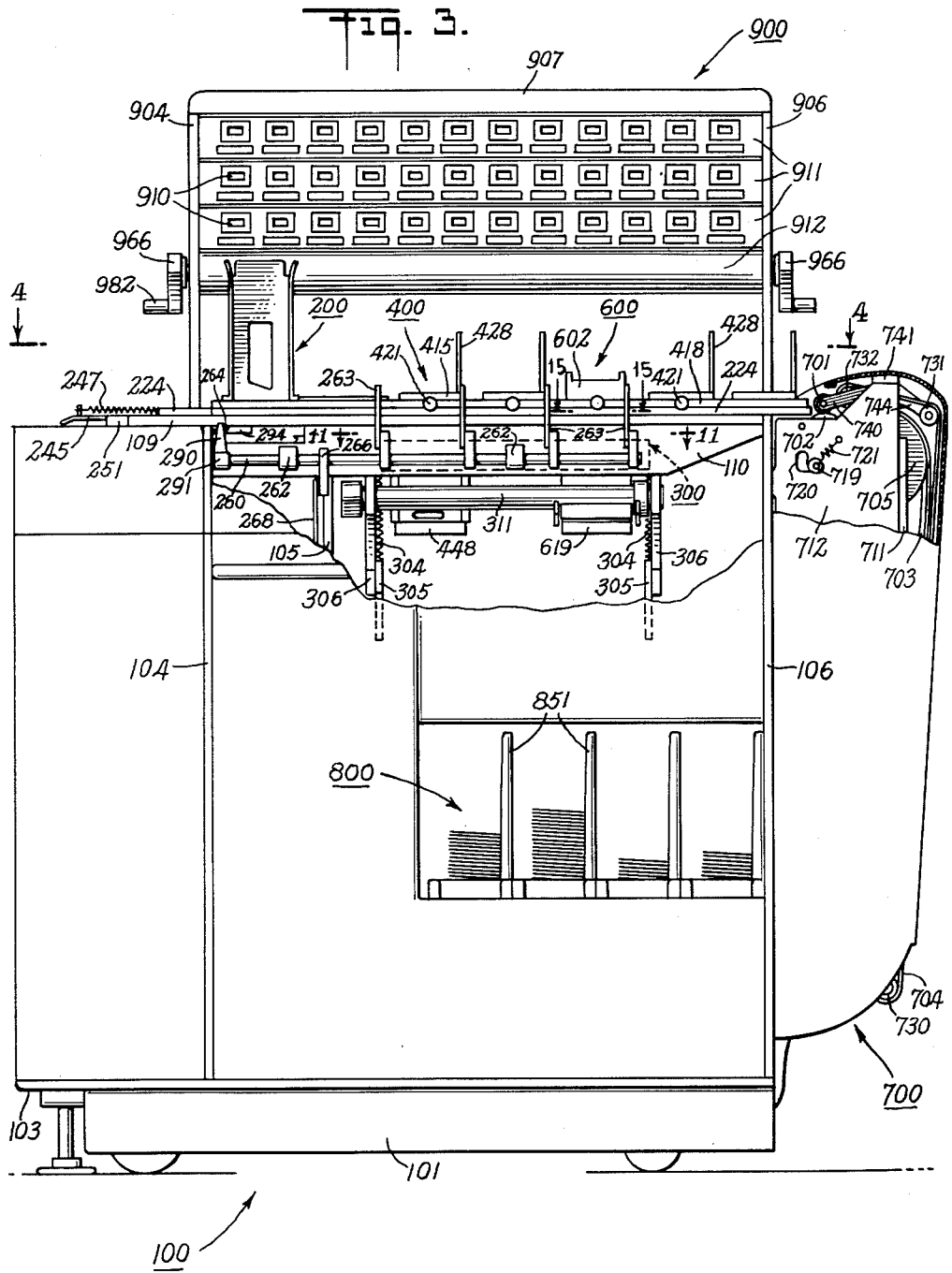

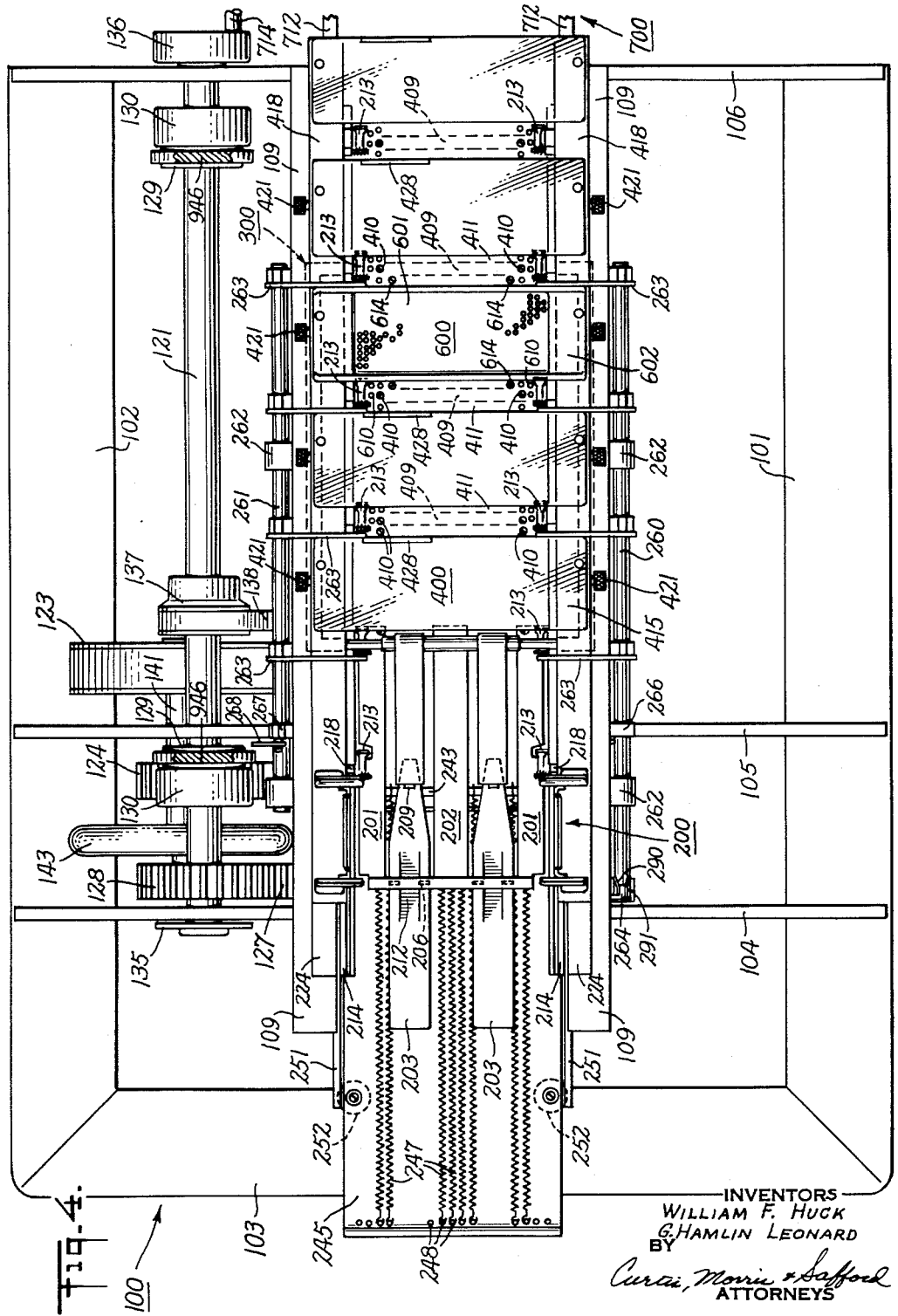

Sept. 14, 1965   W. F. HUCK ETAL   3,206,112
PUNCHING MECHANISM FOR RECORD PROCESSING MACHINE
Original Filed Jan. 4, 1957                 17 Sheets-Sheet 4
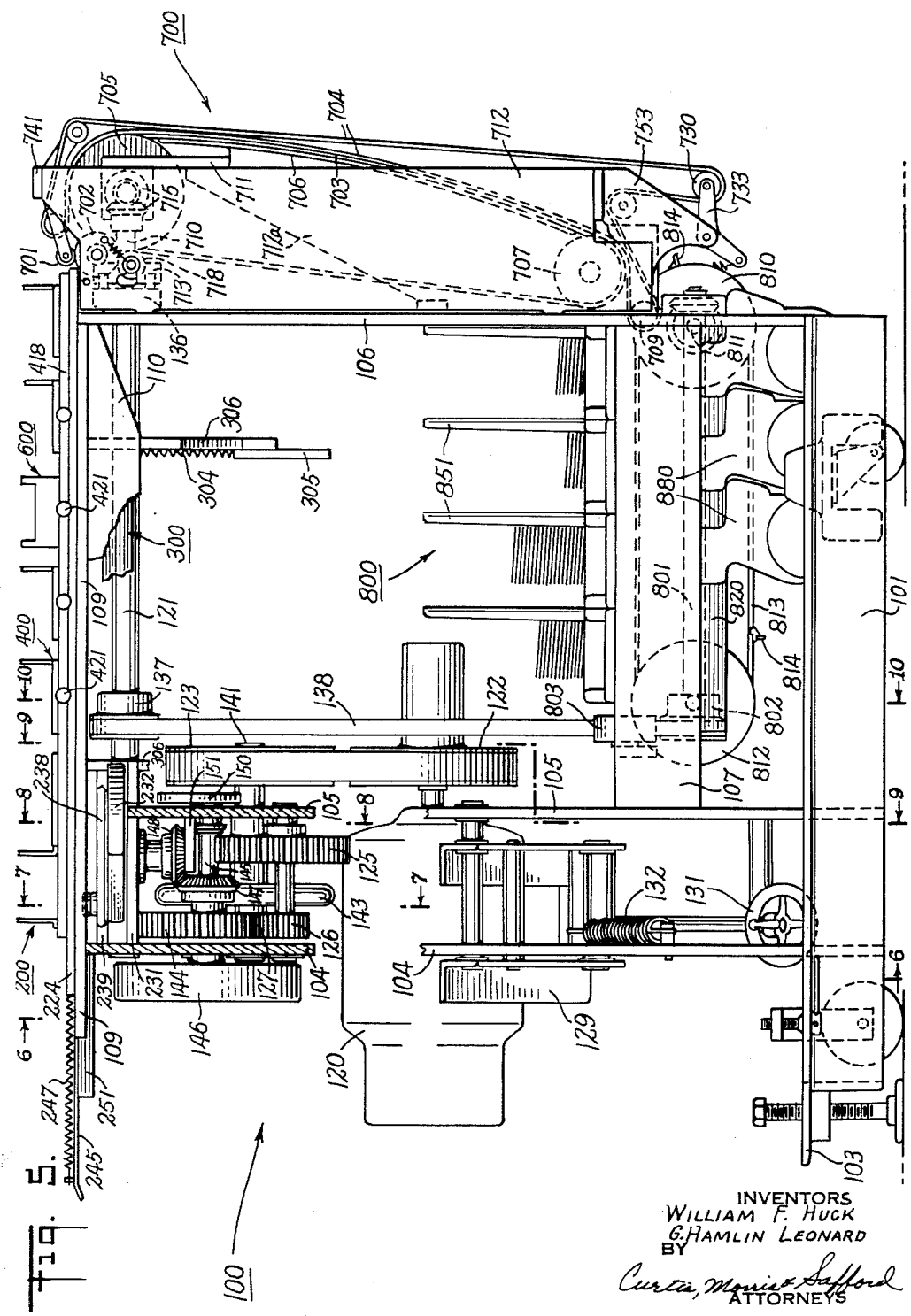
INVENTORS
WILLIAM F. HUCK
G. HAMLIN LEONARD
BY
Curtis, Morris & Safford
ATTORNEYS

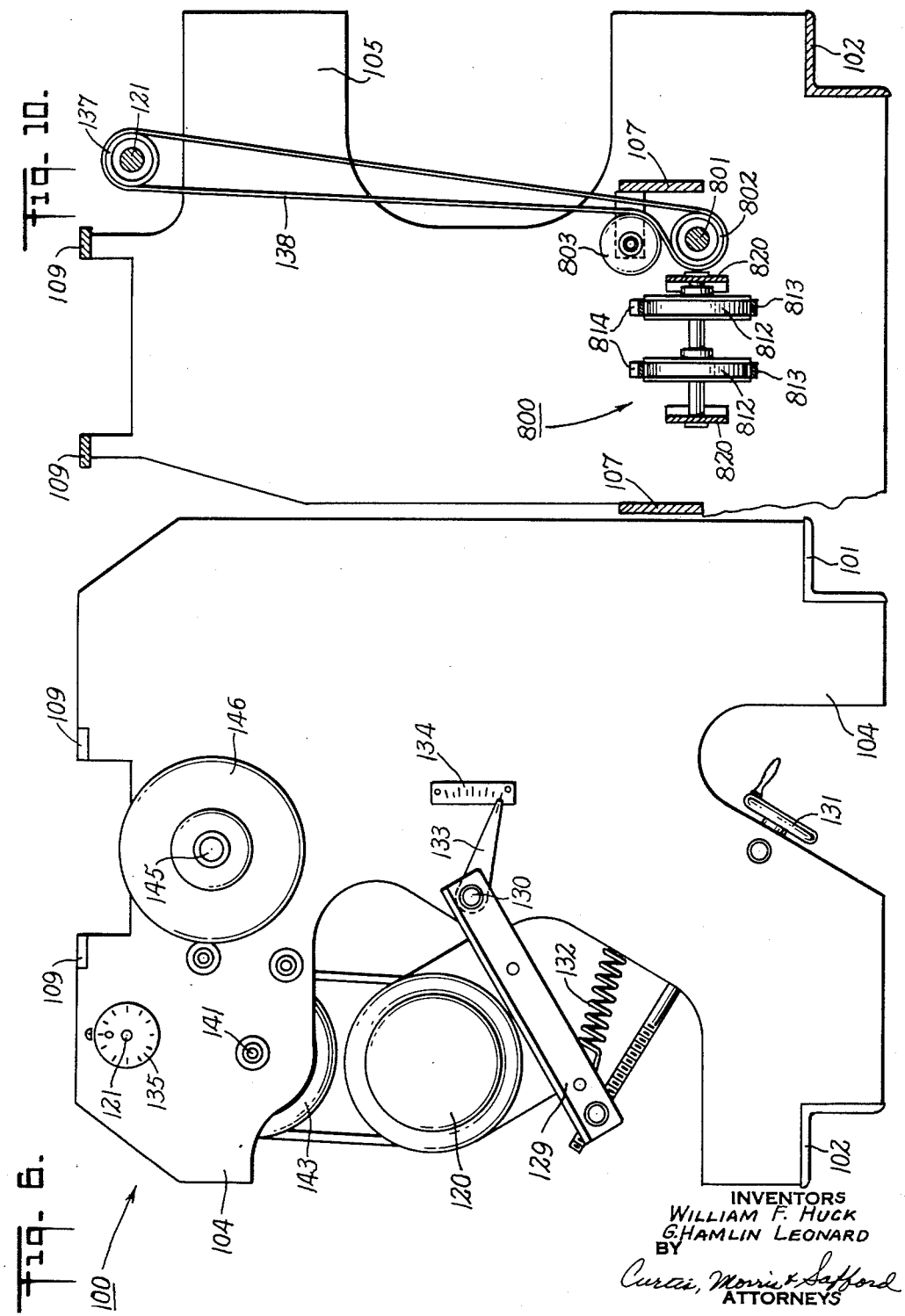

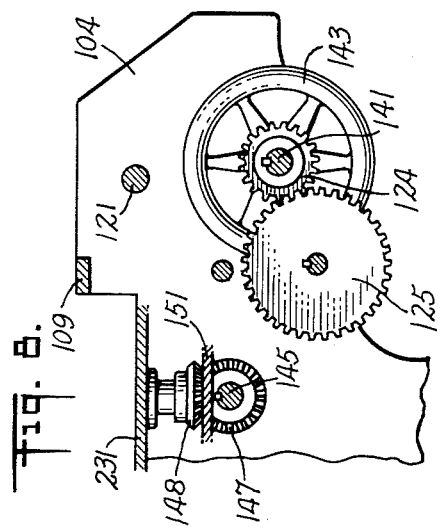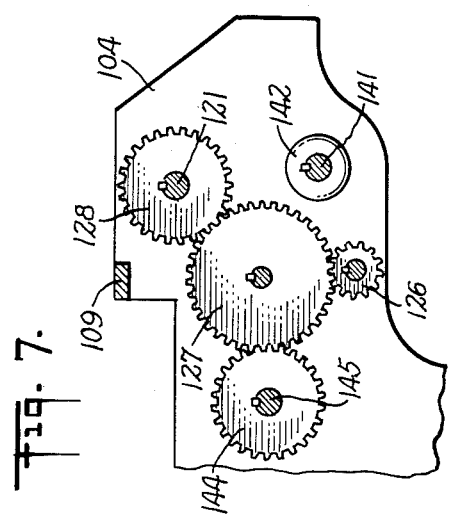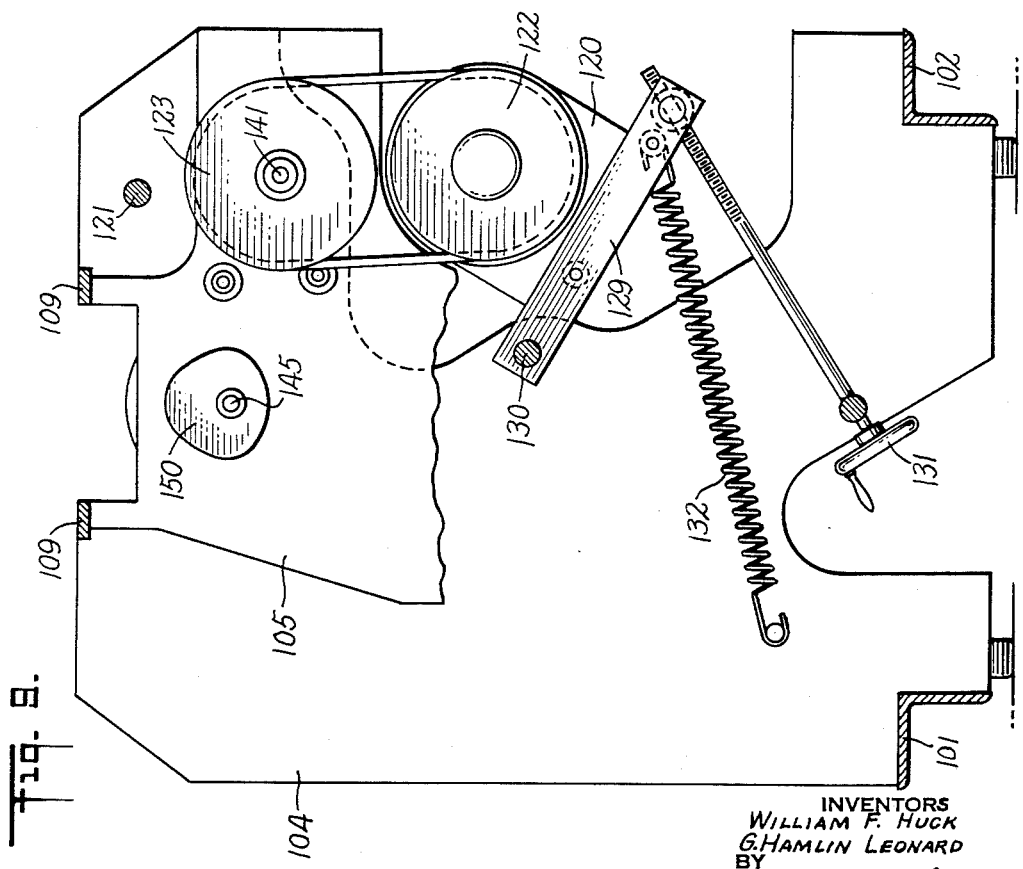

Sept. 14, 1965  W. F. HUCK ETAL  3,206,112
PUNCHING MECHANISM FOR RECORD PROCESSING MACHINE
Original Filed Jan. 4, 1957  17 Sheets-Sheet 7
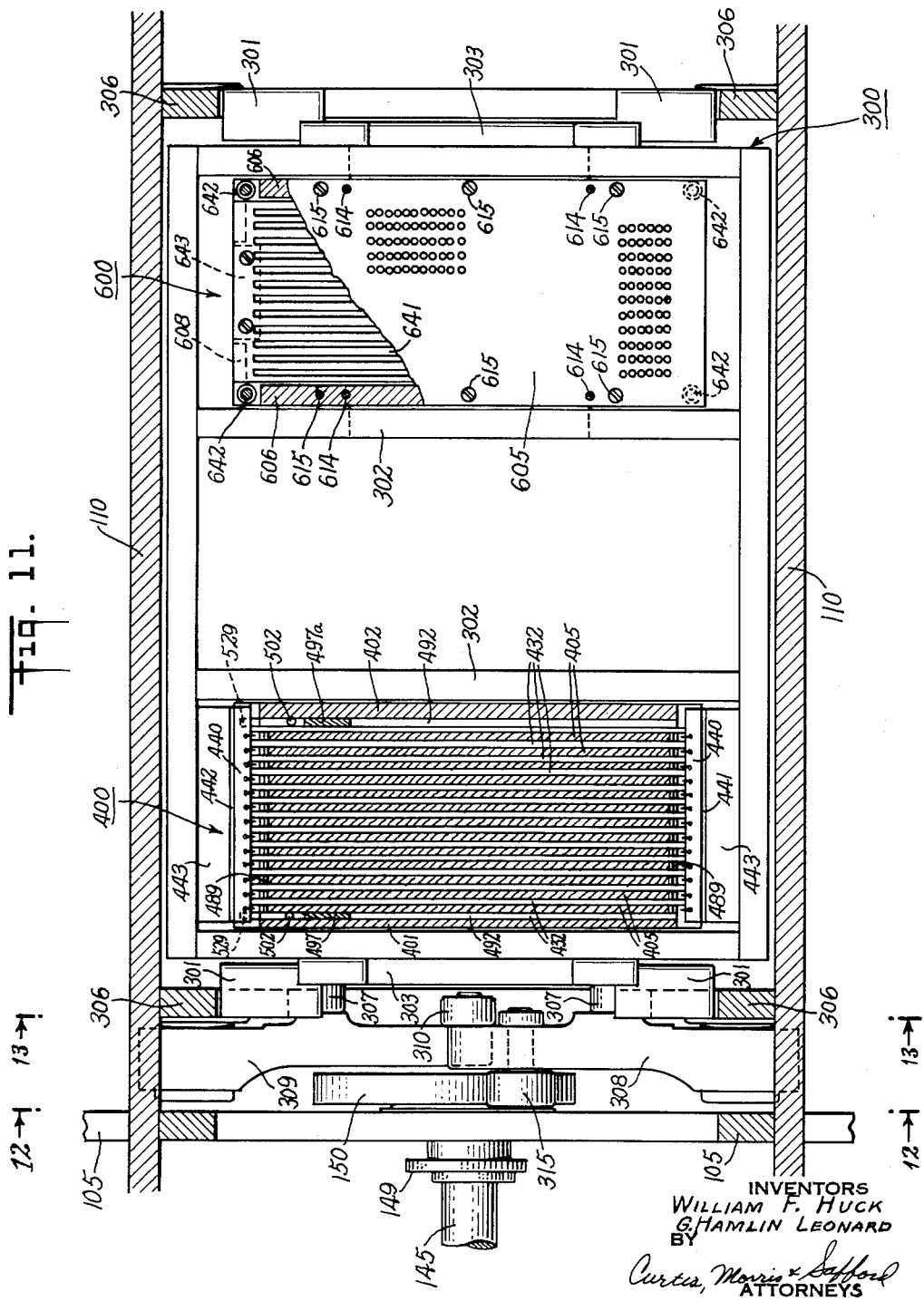
INVENTORS
WILLIAM F. HUCK
G. HAMLIN LEONARD
BY
Curtis, Morris & Safford
ATTORNEYS Sept. 14, 1965 W. F. HUCK ETAL 3,206,112
PUNCHING MECHANISM FOR RECORD PROCESSING MACHINE
Original Filed Jan. 4, 1957 17 Sheets-Sheet 8

INVENTORS
WILLIAM F. HUCK
G. HAMLIN LEONARD
BY
Curtis, Morris & Safford
ATTORNEYS

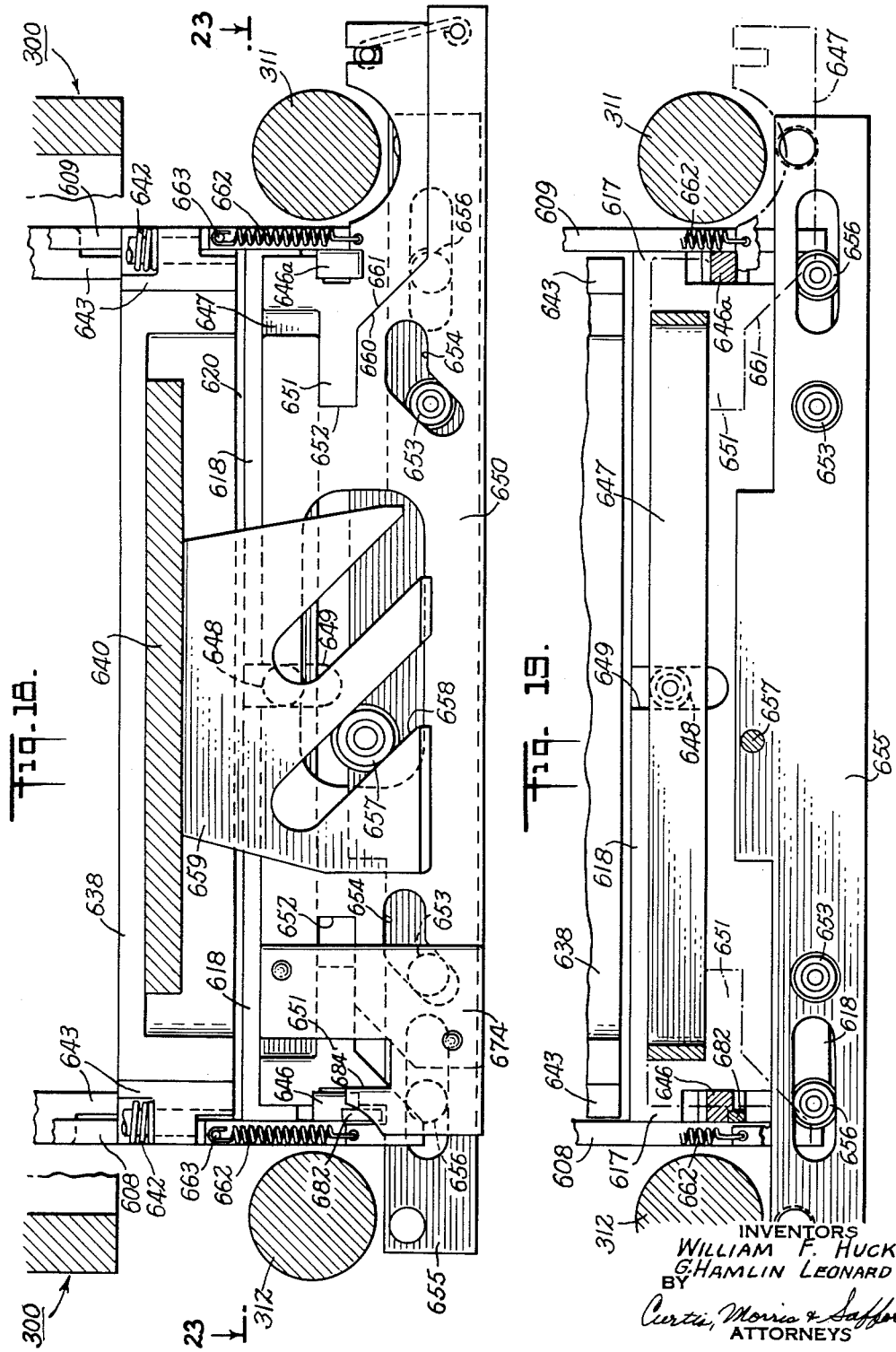

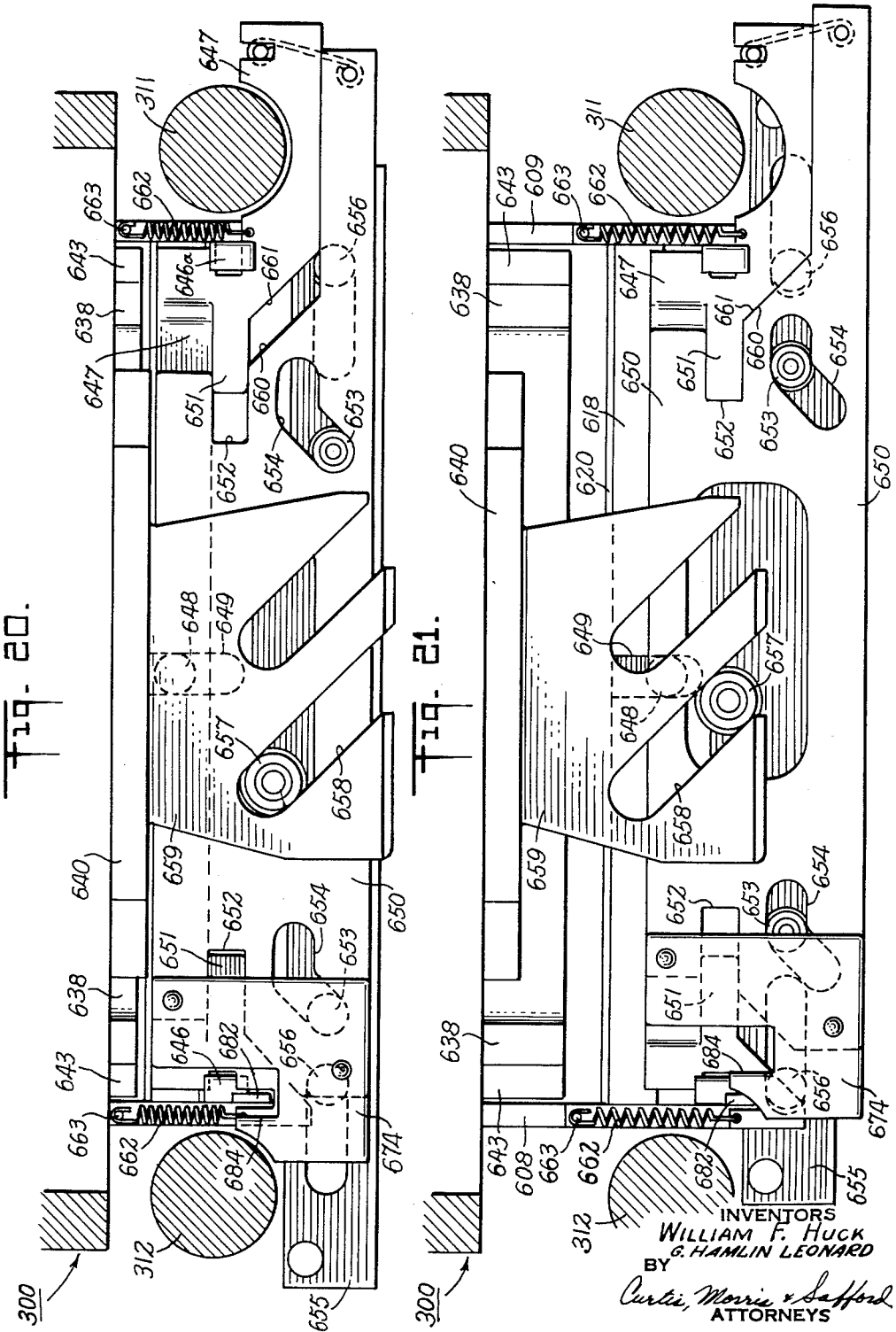

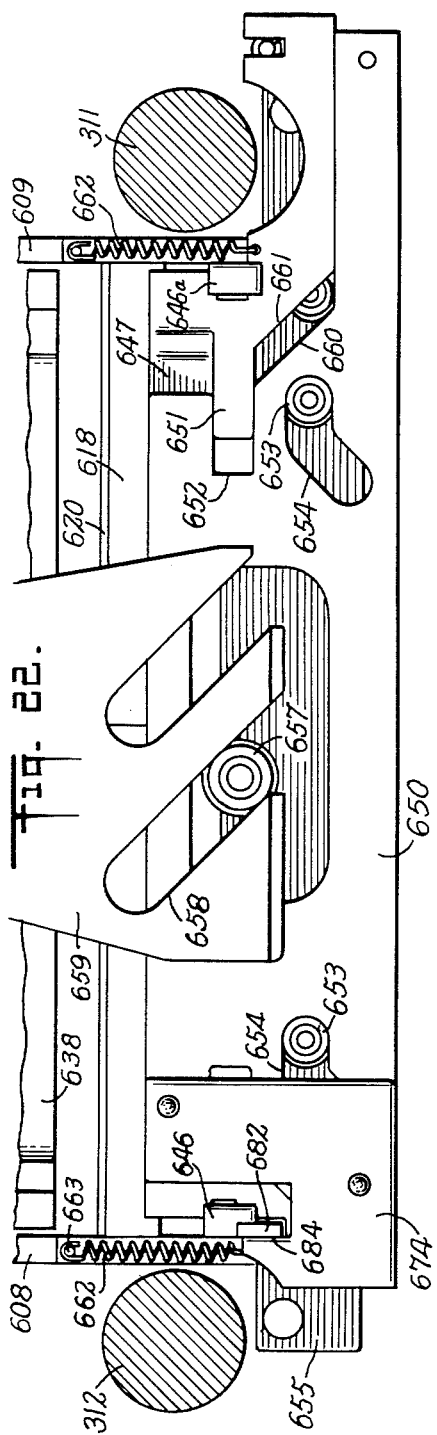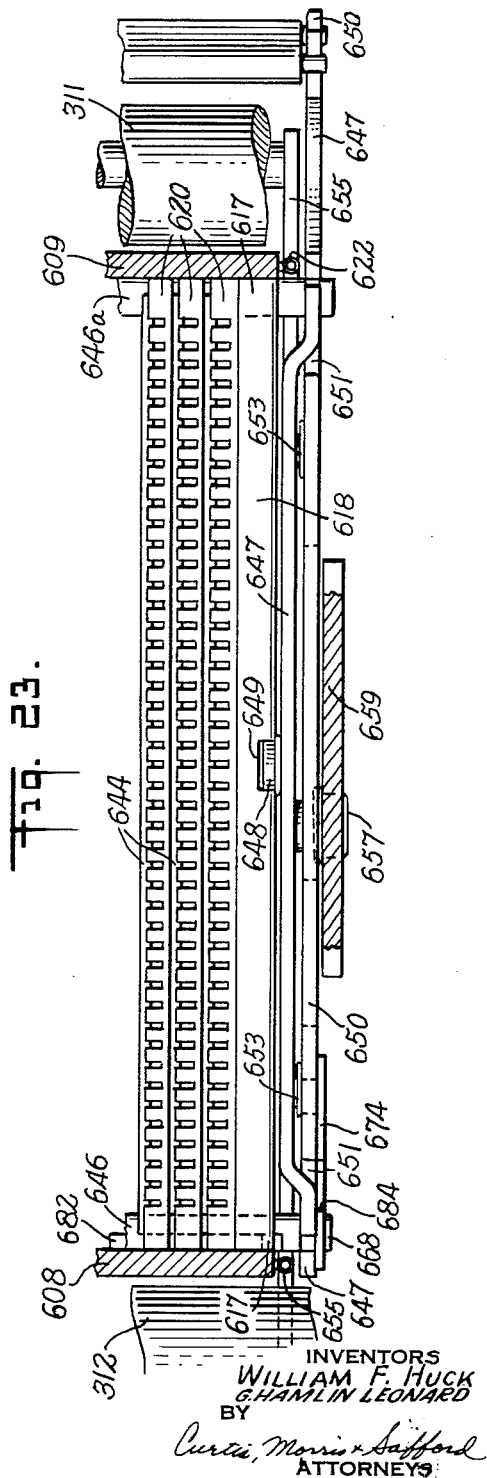

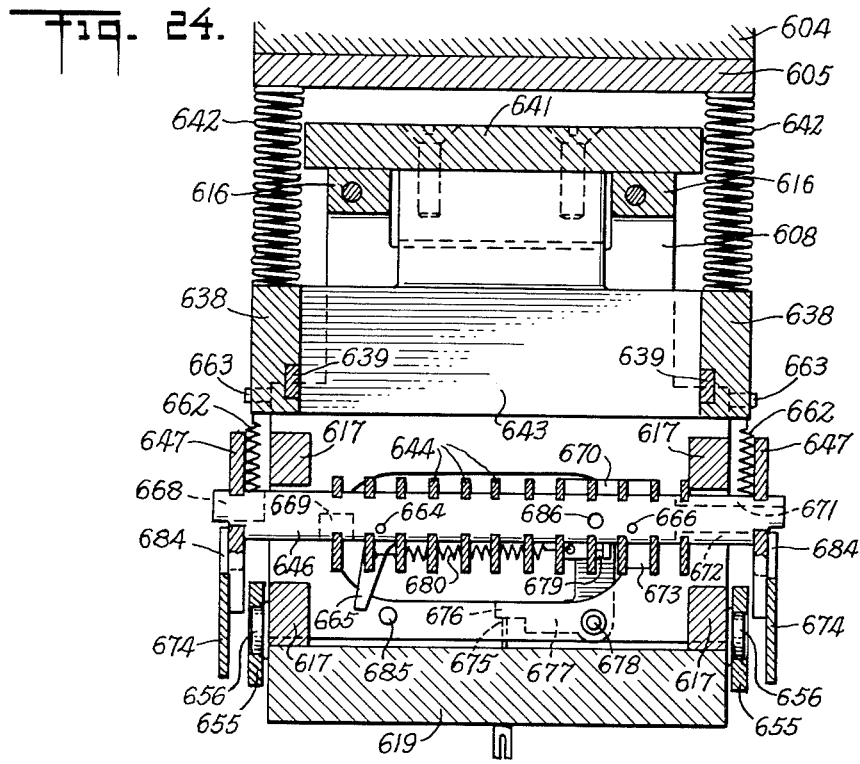
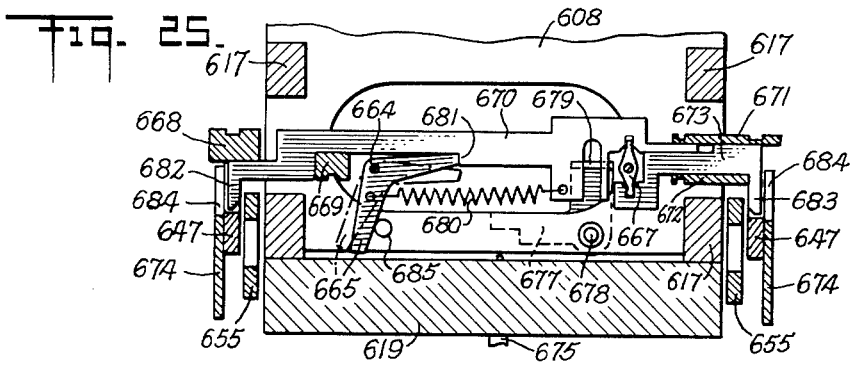
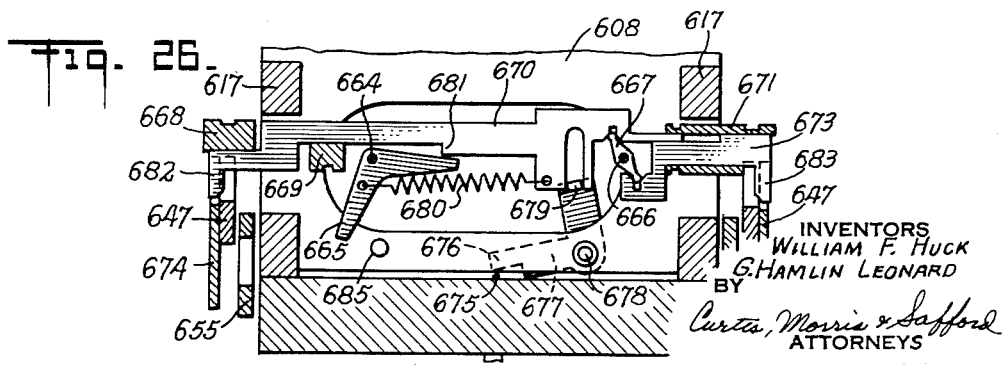

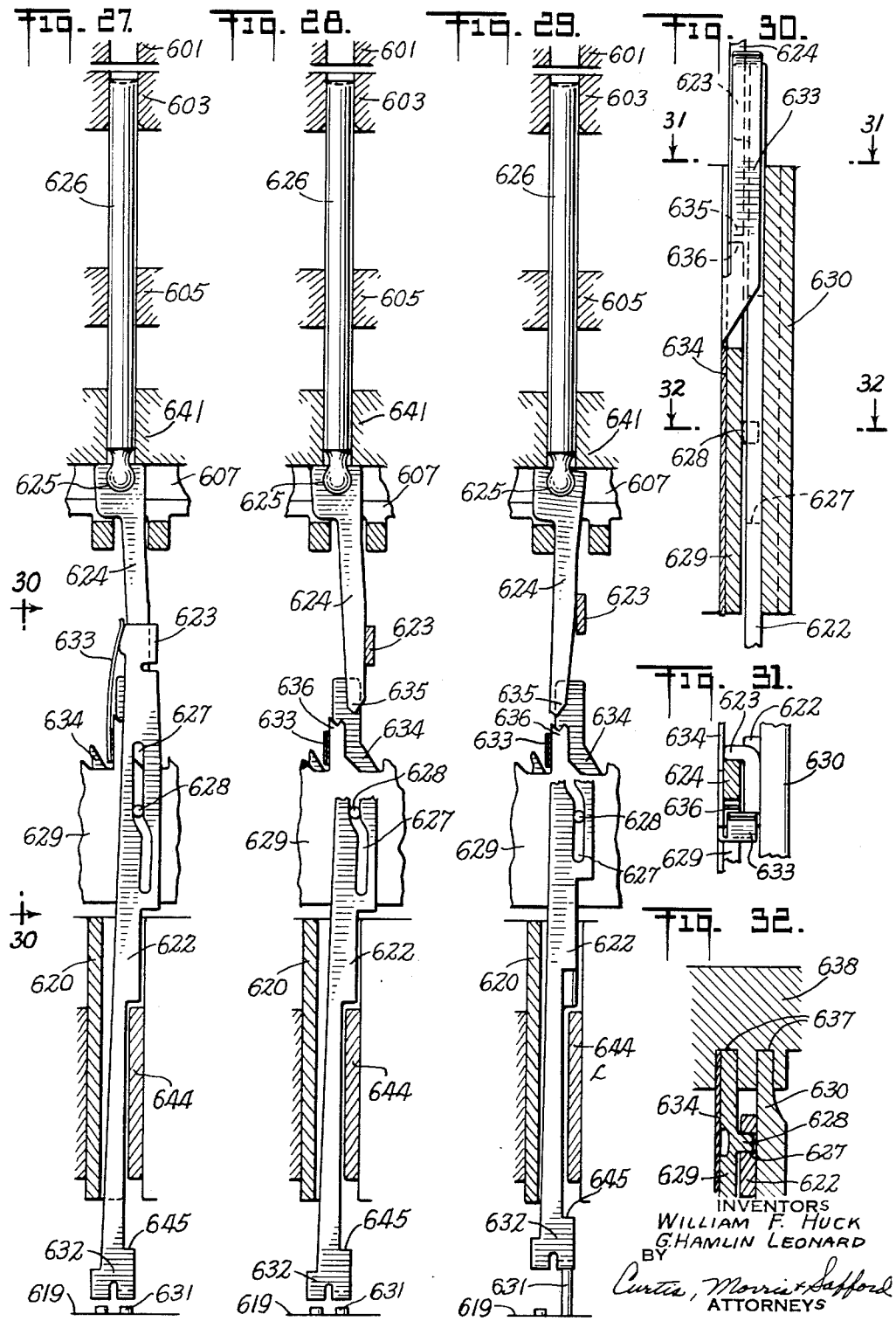

United States Patent Office 3,206,112
Patented Sept. 14, 1965

3,206,112
PUNCHING MECHANISM FOR RECORD
PROCESSING MACHINE
William F. Huck, Forest Hills, N.Y., and George H.
Leonard, Darien, Conn., assignors, by mesne assignments, to William F. Huck, doing business as Huck
Company, New York, N.Y.
Original application Jan. 4, 1957, Ser. No. 632,525, now
Patent No. 3,070,366, dated Dec. 25, 1962. Divided
and this application Nov. 29, 1962, Ser. No. 260,936
4 Claims. (Cl. 234—117)

This application is a division of our prior application Serial No. 632,525, filed January 4, 1957, entitled Record Processing Machine, now Patent No. 3,070,366 issued December 25, 1962; and this invention relates to an improved business machine and more particularly to improvements in punching cards to record information thereon.

The machine of the invention is useful by itself for a variety of tasks such as punching record indicia in the form of perforations in record cards, sensing data on record cards and providing a statistical analysis thereof, and sorting record cards into categories based on the information sensed from or punched on the cards.

The machine is also useful for driving and/or directing the activities, e.g., the printing of bills, dick strips and the like, of one or more auxiliary machines in response to information sensed from record cards processed in the machine or abstracted directly from said cards in such auxiliary units. In addition, the machine of the invention, whether used with or independently of such units, is useful in combination with computers, memory devices and the like for such tasks as punching more detailed information on a card at one station in the machine in response to signals from a memory device acting on abbreviated information sensed at a previous station and relayed to the memory device.

Generally, the machine of the invention comprises a combination of assemblies, each of which contributes to the processing and feeding of record cards or the like at speeds of the order of 130 to 390 per minute from a magazine, over sensing and punching stations, and through a card return unit to a stacking and sorting unit while recording statistical information in a counter assembly.

The machine and its major component parts have a considerable number of unique features and important advantages. One outstanding advantage is that the machine is readily adaptable to sensing and/or recording information on cards in the form of round holes or more closely spaced rectangular perforations in accordance with prevailing practices, and of being equally adaptable to other indicia-recording systems as well. Another advantage is that the sensing and/or punching of information can, if desired, be restricted to a preselected area of the record cards.

Still another advantage and most unique feature is that the operating parts, particularly of the sensing and punching assemblies, are situated under rather than around or over the travel path of the cards, thus making the cards visible at all times, while said assemblies are themselves readily accessible and replaceable. Further, the sensing assemblies are provided with means for automatically interrupting their respective operations when a card is not presented, or is improperly presented, to them and, upon signal, for repeating their operations in identical manner even though, in the case of the sensor, no new cards are presented and, in the case of the punch, no new signals are received.

The sorting and stacking assemblies, like the sensing, punching, card return and counter assemblies, have the advantage, common to them, of being modular in the sense that their number and location can readily be altered to suit. Thus, for example, the sensing and punching assemblies are interchangeable, being mounted and operated in substantially the same manner; the card return is equally effective whether mounted directly on the basic machine or on an auxiliary device some distance away; the stacker assembly can collect the processed record cards in a single stack, in up to four preselected categories as indicated by signals received from the sensor or an external source if the basic unit alone is used, or in as many as about sixty categories if a sufficient number of auxiliary units are connected to the basic unit embodying this invention; and the counter assembly can readily be adapted to accommodate an almost indefinite number of counters.

Many of the assemblies, particularly the punching, assembly operates on the principle of effectively translating the relatively weak impulse of an actuated signal device into a force, derived from the machine drive, of sufficient strength to accomplish an intended function such as sending a signal from a sensor for punching a card. Futhermore, and perhaps most important for speed of operation, these translations of relatively weak impulses into relatively strong actuating forces advantageously take place while the impulses for the next cycle are already being prepared.

Figure 2:
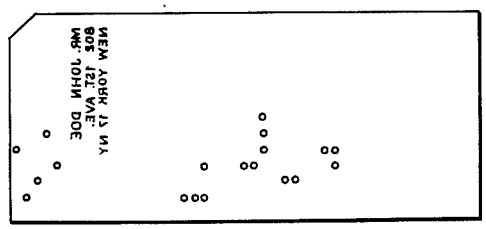

These and innumerable other advantages, as well as the utility of the machine embodying the invention and subcombinations thereof will become apparent from the following description of a specific embodiment selected for illustrative purposes only, said description being made with reference to the accompanying drawings, wherein:

FIGURES 1 to 10, inclusive, illustrate the general arrangement and drive mechanism of the basic unit. FIGURE 1 is a perspective view of the assembled unit; FIGURE 2 is a view of a typical card; FIGURE 3 is a front view of the assembled unit with the casing broken away; FIGURE 4 is a plan view of the table taken on section line 4—4 of FIGURE 3; FIGURE 5 is a front view of the machine with the housing removed to show the drive mechanism, the counter assembly being omitted; and FIGURES 6 to 10, inclusive, are sectional views taken on the correspondingly numbered section lines in FIGURE 5.

Figure 12:
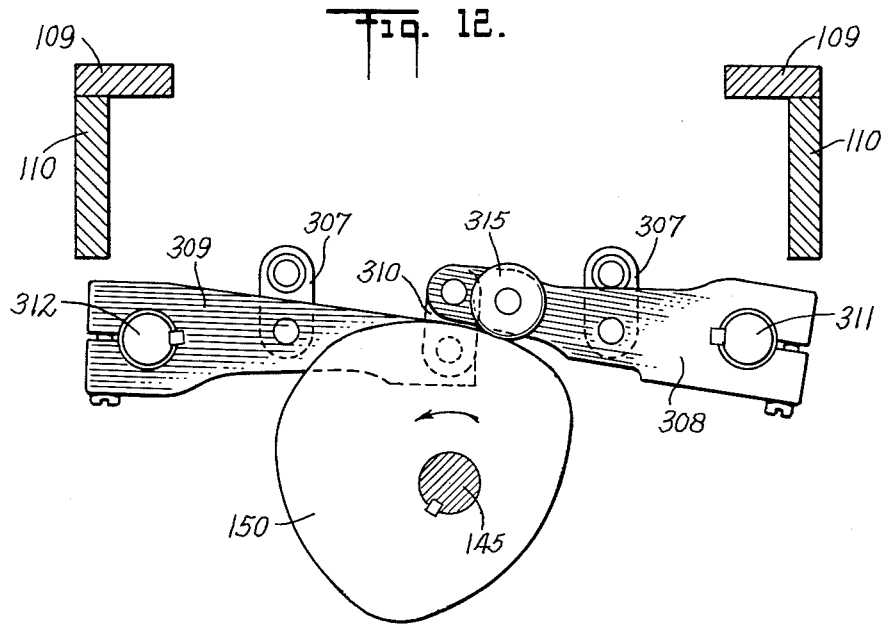
Figure 13:
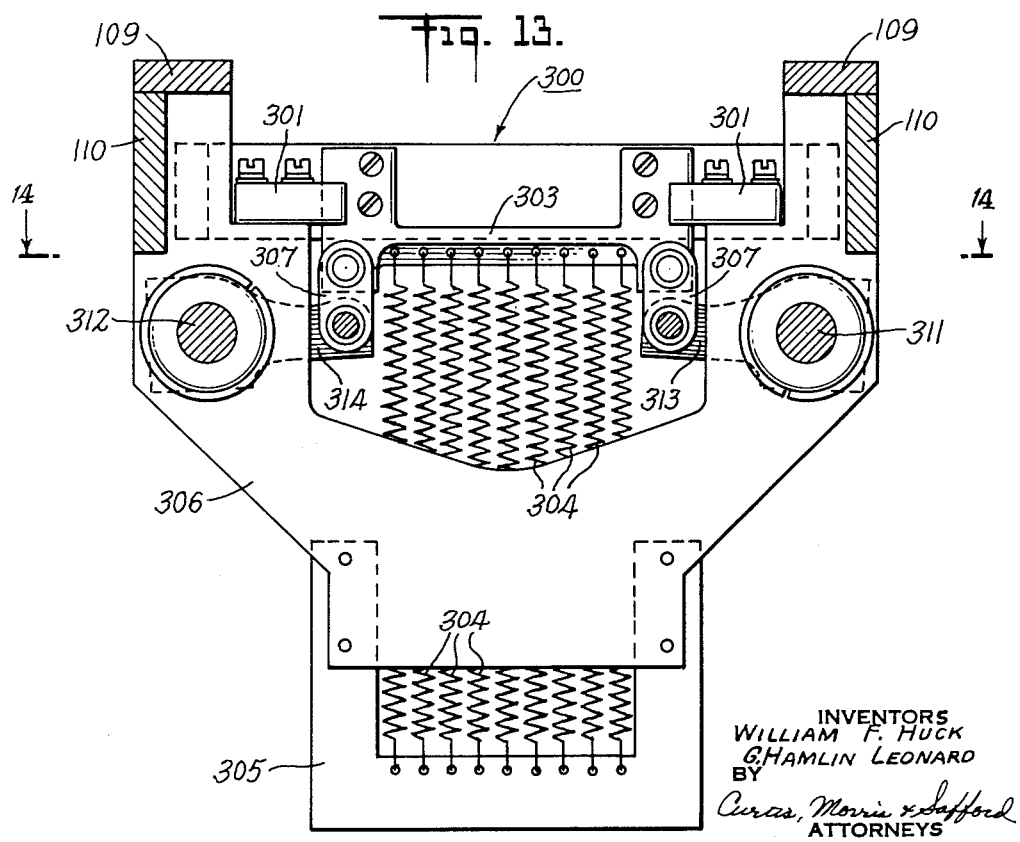
Figure 14:
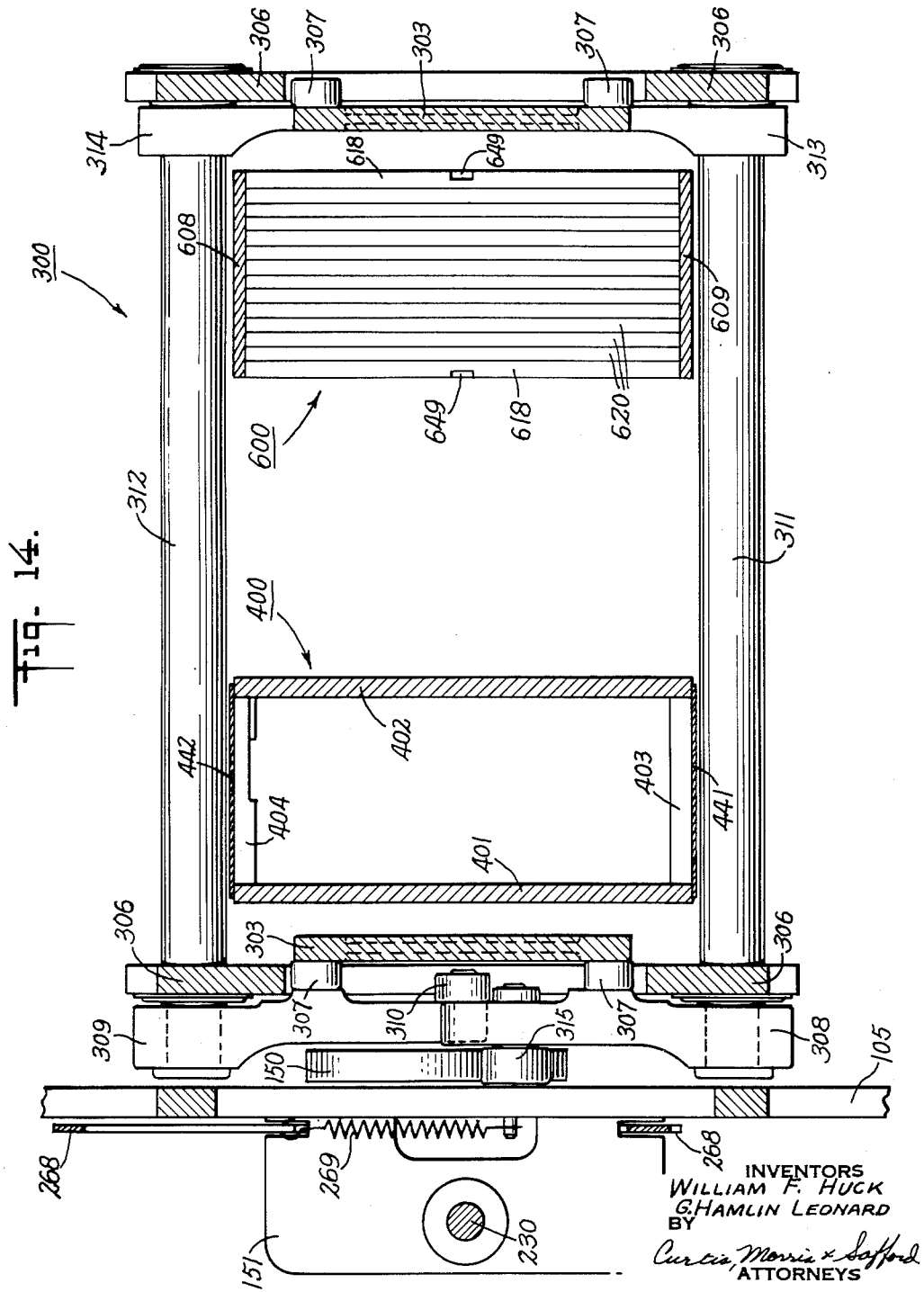

FIGURES 11 to 14, inclusive, illustrate a work operator mechanism for actuating the sensor and punching mechanisms. FIGURE 11 is a plan view taken on section line 11—11 of FIGURE 3; FIGURES 12 and 13 are sectional views taken on the correspondingly numbered section lines of FIGURE 11; and FIGURE 14 is a horizontal section taken on section line 14—14 of FIGURE 33.

Figure 15:
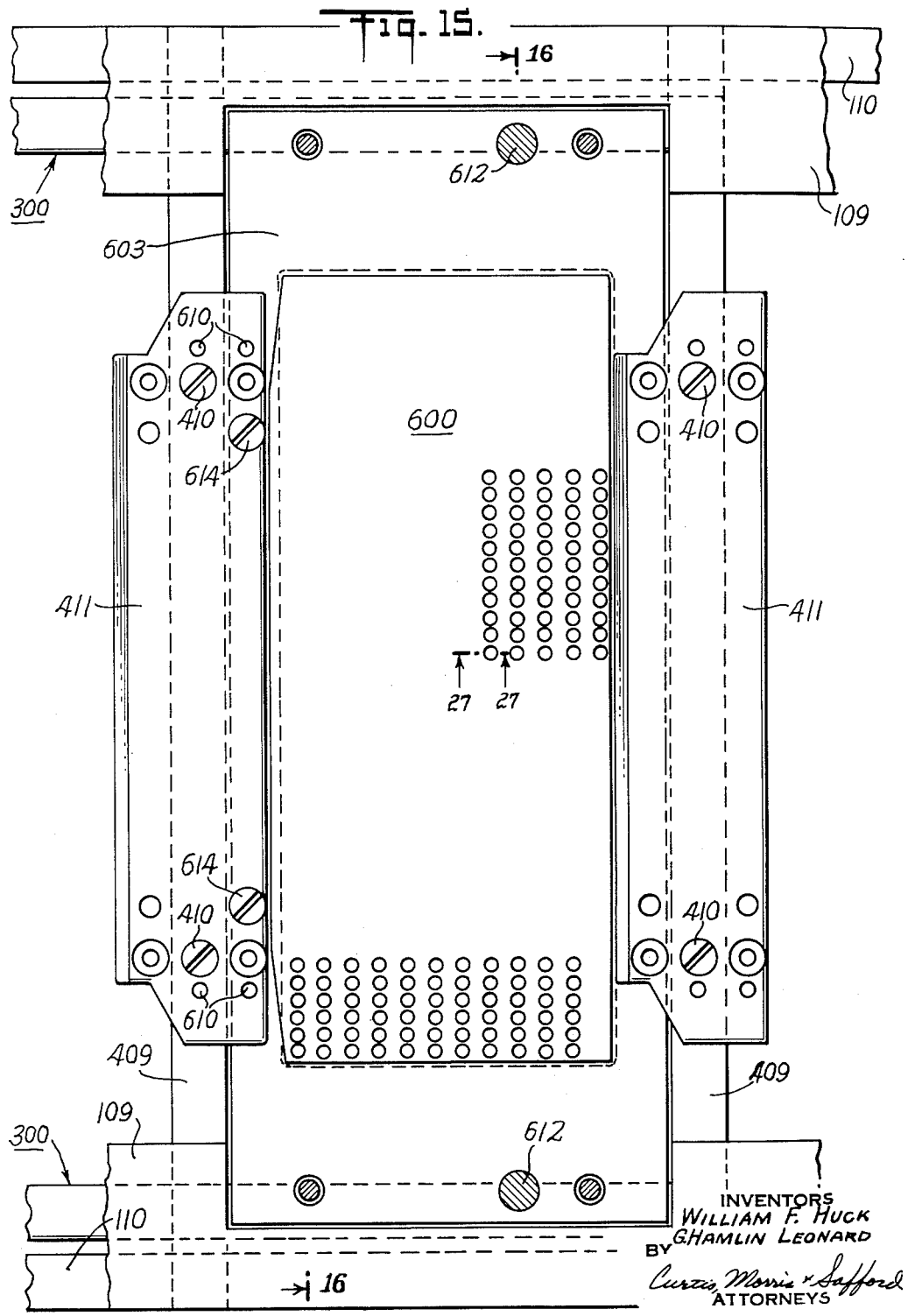
Figure 16:
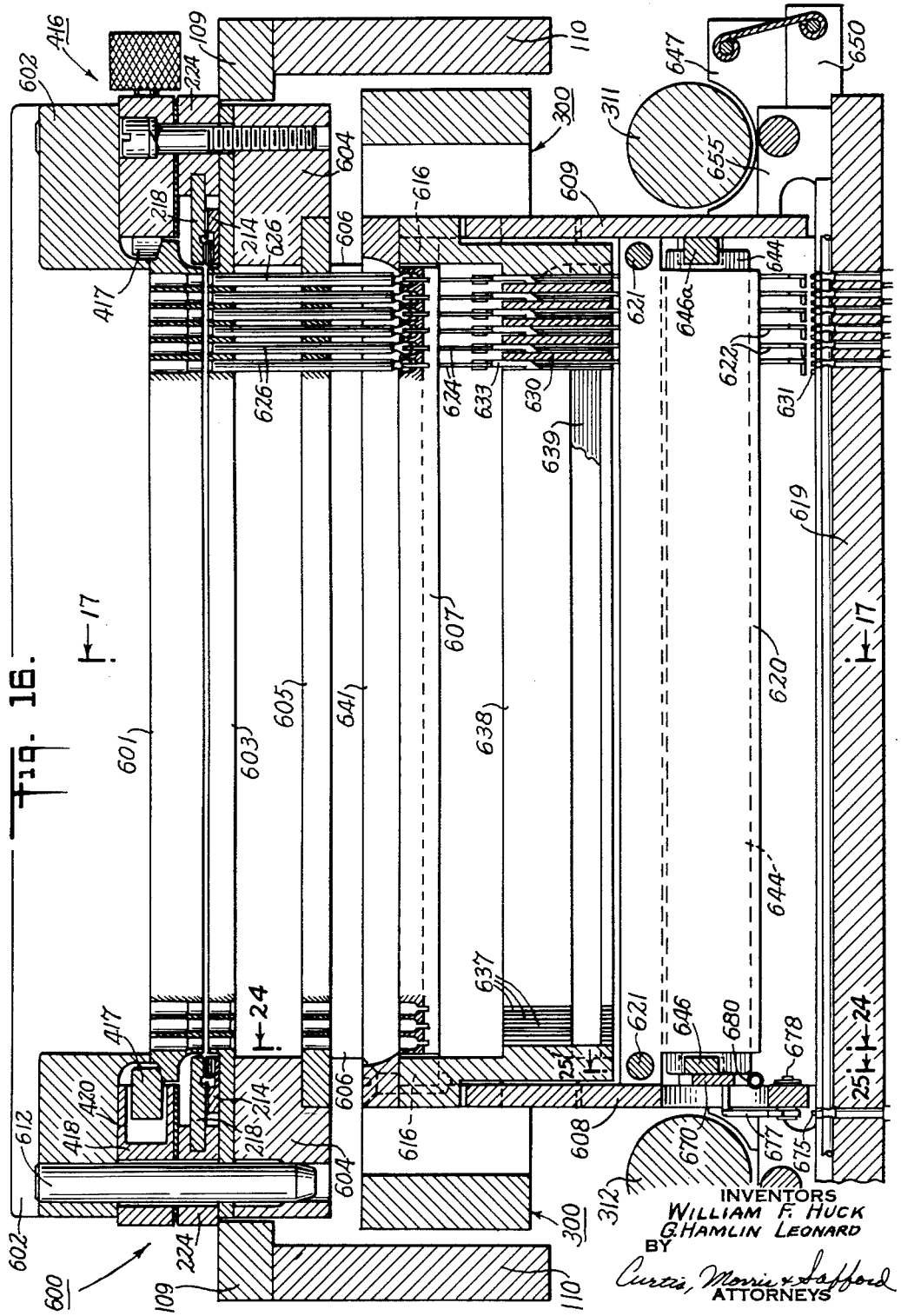
Figure 17:
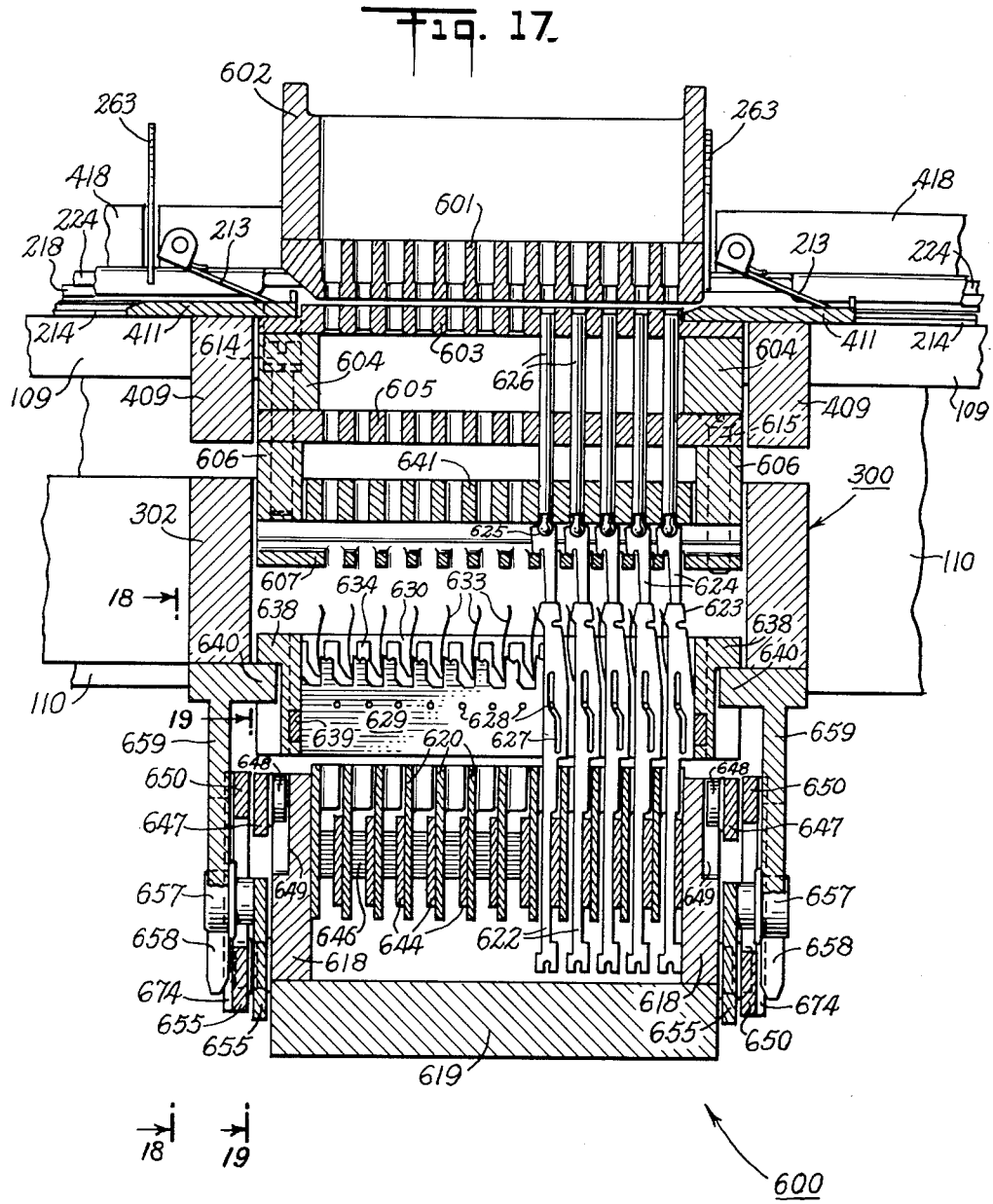

FIGURES 15 to 32 illustrate the punch assembly 600, shown schematically in FIGURES 1 and 3. FIGURE 15 is a plan view taken on section line 15—15 of FIGURE 3; FIGURE 16 is a view taken on section line 16—16 of FIGURE 15; FIGURE 17 is a cross section taken on section line 17—17 of FIGURE 16; FIGURES 18 and 19 are views taken on the correspondingly numbered section lines of FIGURE 17; FIGURES 20, 21 and 22 are views showing the parts of FIGURE 18 in different positions; FIGURE 23 is a horizontal section taken on section line 23—23 of FIGURE 18; FIGURES 24 and 25 are views taken on the correspondingly numbered section lines of FIGURE 16; FIGURE 26 is a view similar to FIGURE 25 showing the parts in a different position; FIGURE 27 is a view, on an enlarged scale, taken on section line 27—27 of FIGURE 15; FIGURES 28 and 29 are views similar to FIGURE 27 with the parts shown in different operative position; and FIGURES 30, 31 and 32 are views taken on the correspondingly numbered section lines of FIGURE 27.

General assembly

The basic unit 100 of the machine of the invention comprises mechanism for advancing record cards such as illustrated in FIGURE 2 individually and in rapid succession from a magazine 200 along the top of the unit 100 to one or more sensing stations 400 and punching stations 600, as illustrated in FIGURES 1 and 3. The basic unit may be, and preferably is, provided with a stacker 800 for selectively collecting record cards that have passed through the sensing and punching stations into two or more classified stacks, a card return 700 that may be attached directly to the basic unit 100, as shown, or to the last of one or more auxiliary units operated by and in conjunction with the basic unit, and a counter 900.

The structural framework of the basic unit 100 includes, as best shown in FIGURES 4 to 10, a lower U-frame comprising front and rear frame members 101 and 102 and a transverse frame member 103, vertical bulkheads 104, 105 and 106, front and rear longitudinal braces 107 and 108 and upper longitudinal members 109 and 110. For mobility, the basic unit is provided with casters 111 and, for levelling, with suitable levelling devices 112.

Drive mechanism of basic unit

The drive for powering the card return, stacker, counter and any auxilitry units between the basic unit and the card return is from a motor 120 to a main drive shaft 121 and companion sheave 123, and a gear train 124, 125, 126, 127, 128 for rotating the main drive shaft 121 by way of a belt-connected variable pitch pulley 122 at a speed of one revolution per machine cycle. To adjust this speed by means of the belt-connected variable speed pulleys 122 and sheave 123, the motor 120 is mounted on a rack 129 pivoted on a pin 130 between bulkheads 104 and 105 and adjusted to a preselected position by means of translating screw and hand wheel 131 against the action of a spring 132. Conveniently, a pointer 133 is mounted on a rack 129 at the pivot pin 130 to indicate speed on an indicator 134 calibrated in terms of cards per minute.

The main drive shaft 121 runs along substantially the entire length of the unit from bulkheads 104 to 106. At the extreme left end, the shaft is provided with a timing device 135 and at the extreme right end, as best shown in FIGURES 4 and 5, with a coupling member 136 for transmitting the drive to the card return mechanism 700 and, if desired, to one or more auxiliary units that may be interposed between the basic unit 100 and the card return unit 700. Between bulkheads 105 and 106, the main drive shaft 121 carries a geared pulley 137 and timing belt 138 for driving, likewise at precisely one revolution per machine cycle, a card stacker cam shaft 801 by way of geared pulley 802 and a tensioning idler 803, as shown best in FIGURE 10. In addition, the main drive shaft 121 carries eccentrics 129 secured thereto by collars 130 for operation of the counter mechanism 900.

To prevent reverse movement of any portion of the machine with consequent damage, maladjustment or jamming of the record cards, the shaft 141 for sheave 123 and gear 124 is provided with an anti-reverse clutch 142. A hand wheel 143 is fixed to the shaft 141 to enable the operator easily to adjust, test and clean the machine.

The idler gear 127 in the train of gears 124–128 engages a gear 144 on a work shaft 145 carrying a fly wheel 146 for steadying the drive of the machine, a miter gear 147 for driving the card feed mechanism by way of companion miter gear 148, a cam 149 for operating a card interrupt device, which is optional on the basic unit, and a cam 150 for actuating a work operator for the sensing and punching mechanisms 400 and 600, respectively. The miter gear 148 is journalled for rotation between a fixed plate 231 and a lower bearing plate 151.

Work operator

The work operator is an assembly designed to provide the forces necessary to a proper operation of sensing units, punch units and possibly other units on the work table of the basic unit. Basically this is accomplished by imparting vertical reciprocation to substantially the entire sensing unit and punching unit, for example, in such a manner as to relieve sensing elements and Bowden wires, individually or in groups, from exerting the entire force necessary to perform their respective functions in a given sensing or punching operation, as will become more evident in the detailed descriptions of the sensing and punching units that are to follow.

Underneath the longitudinal frame members 109 and between the longitudinal frame members 110, and to the right of the record card magazine 200 and rails 201, 202, as seen in FIGURE 4, a rectangular frame 300 is provided for vertical reciprocation guided by four bearing blocks 301. As seen in FIGURE 11, the work operator frame 300 is divided into any desired number of sections by means of cross members 302 to accommodate sensing and punching assemblies described later.

H-shaped spring plates 303 are suitably made fast, one to each of the ends of the work operator frame 300, for carrying the upper ends of a plurality of tension springs 304. The lower ends are secured to U-shaped spring plates 305 carried by generally Y-shaped braces 306 that are secured to longitudinal frame members 109 and 110.

The work operator frame 300 is supported against the downward pulling action of the tension springs 304 by links 307 pivotally connected to the ends of the frame and also to arms 308 and 309 adjacent the left end of the work operator frame 300. The ends of the arms 308 and 309 are linked together by another link 310, as shown best in FIGURE 12. The arms are keyed to the ends of oscillatable shafts 311 and 312 which are parallel to and below the sides of the work operator frame 300. The other ends of the shafts 311 and 312 are made fast to arms 313 and 314 each carrying, like arms 308 and 309, links 307 having one end pivoted on the right end of the work operator frame 300.

The arm 308 fast on the shaft 311 is provided with a cam follower 315 for following the contour of the work operator cam 150 on the work shaft 145.

It is apparent, therefore, that as the work operator cam 150 rotates, the cam follower 315 will be urged to follow its contour by action of springs 304 so as to oscillate the arms 308 and 309, and therefore also shafts 311 and 312 which in turn oscillate the arms 313 and 314 so that the four links 307 act simultaneously and with equal force to raise and lower the work operator frame 300 once for each revolution of the work shaft 145. The relatively short, substantially circular portion of the work operator cam contour intermediate the high and low portions thereof, as shown best in FIGURE 12, operate momentarily to slow the movements of the work operator frame between the lower and upper portions of its vertical stroke.

Punch assembly

It is the function of the punch assembly 600, as the name indicates, to perforate a record card in response to signals received from another part of the machine, e.g., the sensor, or from an external source. The assembly and its component parts and structure are illustrated in FIGURES 15 to 32 of the drawing.

The punch assembly specifically described herein for purposes of illustration is provided with a mechanism for nullifying the effects of punch signals received by the assembly unless a special qualifying signal is also received, as well as with a device for locking the mechanism so that it will punch in accordance with actuating signals regardless of whether a qualifying signal is received.

Referring now primarily to FIGURES 15, 16, 17 and 24, the assembly comprises a die plate 601 in a die bed 602 supported on longitudinal blocks 418 above the card path, and a fixed frame including a top punch plate 603, a punch bed 604, a punch under plate 605, left and right spacer bars 606, a punch flipper plate 607, and rear and front end plates 608 and 609, respectively, below the card path.

The die plate 601 is perforated with round or rectanular holes, depending upon the record indicia system employed, round holes being shown for purposes of illustration. The plate 601 is dowel fitted and screwed to the die bed 602 and, as shown best in FIGURE 52, is latched to longitudinal block 418 by means of a spring-biased lock 416 similar to that for the sensor cover plate 415 so that the die plate-die bed assembly 601, 602 can be removed simply by pulling the knobs 421 and lifting them off as a unit.

The top punch plate 603 is properly located with respect to the punch position of the cards by means of dowels 610 in the top punch plate and in cross brace members 409 and the left (as seen in FIGURES 15 and 17) card guide plate 411. The plate 603 is clamped by punch bed 604 bolted to longitudinal blocks 418 against rails 224 by means of bolts as shown best in FIGURE 16. Aligning pins 612 are used to align the holes in the top punch plate 603 accurately with those in the die plate 601.

The screws 614, tapped into spacer bars 606, clamp plate 605 to bed 604 and in effect support the entire lower and most readily removable portion of the punch assembly 600. Flipper plate 607 is made fast to spacer bars 606 and plate 605 by machine screws 615 and in turn supports end plates 608 and 609 on bosses 616, as shown best in FIGURES 17 and 24. The lower portions of the end plates 608 and 609 are connected to bosses 617 on side plates 618, from which a Bowden connector block 619 is hung and between which a group, twelve in the embodiment shown, of intermediate flipper guide plates 620 are fixed by means of aligning rods 621.

The parts described to this point are all stationary during the operation of the punch assembly 600. It will be apparent that by unscrewing the screws 614 and disengaging the rail blocks 640 from the work operator, the entire lower portion of the assembly including punch underplate 605 and the parts beneath it can readily be dismounted for inspection or replacement.

The flipper guide plates 620 are slotted, as best shown in FIGURE 23, slidably to receive set-up blanks 622, the upper end of which have bent ears 623 slidably engaged with flippers 624, the upper socket ends 625 of which are in turn connected to punches 626, as shown in FIGURES 27 and 29. Each set-up blank 622 is provided with a positioning slot 627 slidable on a stud 628 on a lift bar 629, and is retained thereon by an adjacent spacer plate 630.

When a punch signal is received by upward movement of a Bowden end 631, it acts on a foot 632 to elevate set-up blank 622 to the position shown in FIGURE 29, the blank 622 at the same time being pivoted counterclockwise against the action of a spring 633 on a spring sheet 634 due to movement of the slot 627 of the stud 628. This causes ear 623 to pivot flipper 624 clockwise around the ball end of punch 626 so that the point 635 will be brought into a position directly in line with a notch 636 on lift bar 629.

It is to be understood that when the punch assembly is set up to punch more closely spaced rectangular or other shaped holes, the set-up blanks 622 will be closer together and that each will of necessity be provided with a foot engageable by only one Bowden end, rather than two, as shown. It may also be necessary, due to spacing requirements, to stagger the rows of Bowden ends 631 in the block 619.

The spring sheet 634, lift bar 629 and spacer plate 630 are repeated in sequence across the narrow length of the punch assembly. These members are positioned in slots 637 of side rails 638 and held in place by keys 639, as shown best in FIGURES 17 and 32. When the punch assembly is set up to punch more closely spaced rectangular holes in the record card, the spacer plates 630 are replaced by spring sheet and lift plate assemblies 634, 629. It is to be understood of course that by variation of the spacing of the slots 637 in the side rail members 638 various types of cards can be accommodated. The rail members are reciprocated vertically by abutment with rail blocks 640 so as to travel with the work operator 300 for the upper portion of its stroke.

It will be apparent, therefore, that when a Bowden end 631 moves up in response to a signal, the corresponding flipper 624 is moved so that the pointed end 635 thereof will be in line for engagement by the notch 636. At the beginning of the upper portion of its stroke, the work operator 300 makes contact with the side rails 638, and thereupon during the upper part of its stroke, will elevate the entire assembly including spring sheets 634, lift bar 629, spacer plate 630, flippers 624 and punch 626 to punch a hole in the card at the punch station. The material punched from the card is pushed up through the die plate 601 and into the die bed 602 for disposal.

When a punch signal is not received, upward movement of the lift bar 629 will simply cause the notch 636 to move up past the flipper point 635 so that the corresponding punch 626 will not be actuated.

To retract an actuated punch 626, the lower edge of a punch stripper plate 641 abuts against and pushes down the flipper 624, the punch stripper plate being urged downwardly by compression springs 642, shown in FIGURE 24, abutting at the upper end against plates 605 and at the lower end against movable end plates 643 fast to side rails 638. The punch 626 is thereby pulled down by the socket in the upper end of flipper 624. The socket end of the flipper 624, shown in FIGURES 27 to 29, is so shaped that when the punch stripper plate 641 bears against it, it tends to rotate the flipper in counterclockwise direction, aided by spring 633, so as to avoid reengagement of point 635 with notch 636. The downward travel of the assembly 638, 641, 643 is arrested by the punch stripper plate 641 coming to rest on the punch flipper plate 607.

To retract the set-up blank 622 while an actuated punch 626 is performing its function, a reset bar 644, shown in FIGURES 17, 24 and 27 to 29, is provided to engage a ledge 645 on set-up blank 622 with its lower edge, normally after the side rails 638 have been engaged by the rail blocks 640 and the notch 636 has engaged the pointed end of flipper 624. The ends of the reset bars 644 are mounted on notched cross keys 646 and 646a which are in turn connected at their respective ends to reset links 647, as shown best in FIGURES 17 and 20. The links 647 each have a roller 648 for vertical movement in slots 649 of the stationary side plates 618 and are actuated for vertical reciprocation by slide cams 650 by engagement of ears 651 on links 647 in recesses 652 in slide cams 650, the ears 651 and end portions of links 647 being bent outward to the planes of the associated slide cams 650, as shown best in FIGURE 23.

During normal operation, the slide cam 650, shown best in FIGURES 18 to 23, is movable vertically and horizontally by reason of the camming action of rollers 653 in angle slots 654 in slide cams 650. The rollers 653 are rotatable on studs fixed to a cam follower plate 655 (see FIGURE 19) slidable horizontally below and in the same plane as the central portion of reset link 647 on rollers 656 mounted for rotation on the stationary side plate 618. The cam follower plate 655 on each side of the assembly 600 carries a cam follower 657 engaged with a cam slot 658 in a cam plate 659 that is fast to and vertically reciprocable with rail block 640, as shown best in FIGURES 17, 18, 20 and 21.

It will be apparent, therefore, that as the work operator 300, rail blocks 640 and cam plates 659 move up and down, their vertical motion is translated into a horizontal sliding movement of the cam follower plates 655, to the right as seen in FIGURES 18 to 23 on the upstroke and to the left on the downstroke. As the plates 655 and their rollers 653 move to the right during the upstroke, they carry with them, to the right, the slide cams 650 until the oblique edges 660 thereon abut complementary edges 661 on the outwardly bent portions at the right ends of reset links 647. The links 647 and slide cams 650 are at all times retained at the same elevation relative to one another by horizontal sliding engagement of ears 651 on links 647 with rescesses 652 in slide cams 650 and the said members 647 and 650 are, up to the time of abutment between edges 660 and 661, resiliently restrained against downward movement by means of tension springs 662 anchored on studs 663 in stationary rear and front end plates 608 and 609 and hooked into suitable holes in the reset links 647, as shown in FIGURES 18 and 20 to 23.

As the upstroke of the work operator 300 continues and the slide cams 650 can no longer move to the right with cam follower plates 655 due to abutment of edges 660 and 661, the rollers 653 on cam follower plate 655 move along angular slots 654 from the position shown in FIGURE 20 to that shown in FIGURE 21 to depress the slide cams 650 and thereby also reset links 647. Thus it follows that after some delay while the slide cams 650 slide over links 647, the links 647 carry cross keys 646 and therefore reset bars 644 down during the upstroke of the work operator, thereby to return Bowden-actuated set-up blanks 622 and incidentally also Bowden ends 631 to the signal-receptive position, shown in FIGURES 27 and 28, by engagement of ledges 645 thereon with the bottom edges of the descending reset bars 644 while the associated punches 626 are elevated by the work operator 300 by way of rail blocks 640, side rails 638, lift bars 629 and notch-engaged flippers 624.

It will also be apparent, of course, that during the succeeding downstroke of the work operator 300, the cam plates 659 will force the cam follower plates 655 to the left, as seen in FIGURES 18 to 23, the slide cams 650 up and to the left, and the reset links 647 up, thereby to elevate the reset bars 644 to the positions shown in FIGURES 27 to 29.

In order to make it possible to cancel out, at will, signals transmitted by Bowden ends 631, as for example when it is desired to punch a card in response to signals received from a sensor only when the sensed card has a perforation in a preselected location, the punch assembly 600 is provided with a quick reset device. This allows the punch assembly to operate in the manner described only if a special qualifying signal is received. If such a signal is not received, the quick reset device retracts all set-up blanks 622 that have been actuated by signals from Bowden ends 631 before the corresponding flippers 624 have been engaged in their respective notches 636, and thereby completely avoids punching on that upstroke.

To this end, the key 646 at the rear end of the assembly 600 adjacent rear end plate 608 is, unlike key 646a at the front end, provided with stud 664 pivotally carrying a latch 665, a second stud 666 carrying a rocking link 667, projections 668 and 669 for guiding a first selector slide 670, and projections 671 and 672 for guiding a second selector slide 673, as shown best in FIGURES 24 to 26, and cam stop hooks 674 are made fast to slide cams 650, as shown in FIGURES 18 to 26.

When the qualifying signal referred to previously is received, as manifested by an upward movement of Bowden end 675, it pushes against a toe 676 of a link 677 to rotate the link clockwise about a pivot 678 on rear end plate 608 from the position shown in FIGURE 26 to that shown in FIGURE 25. A bent finger 679 on link 677 slidably engages a vertical slot in selector slide 670 to retract it to the right, as seen in FIGURES 25 and 26, against the tension of a spring 680 until the latch 665 engages a ledge 681 on the slide 670 to lock it into the position shown in FIGURE 25. At the same time, the rocking link 667, engaged at its ends in notches on the slides 670 and 673, is rotated clockwise to retract slide 673 to the left.

It will be apparent, therefore, that when the link 677 is actuated by the Bowden end 675, the selector slides 670 and 673 will be retracted to and locked in the position shown in FIGURE 25 so that the depending fingers 682 and 683 on slides 670 and 673, respectively, move out of the notches 684 of the cam stop hooks 674, thus permitting slide cams 650 to move to the right, as seen in FIGURES 18 to 23, with cam follower plates 655 before depressing the slide cams 650 and therefore also the reset links 647 during the upstroke of the work operator 300 and generally to permit the flippers 624 corresponding to actuated set-up blanks 622 to be engaged by the notches 636 of the lift bars 629 and therefore to complete the punching operation at the top of the upstroke.

When the reset links 647 descend, as previously described, they also carry with them the cross key 646 and therefore the assembly of selector slides 670, 673, latch 665 and rocking link 667. As this assembly descends from the position shown in FIGURE 25 to that shown in FIGURE 26, the lower arm of the latch 665 is cammed for clockwise rotation against a stud 685 on rear end plate 608. As descent continues and the latch 665 is rotated clockwise due to the action of the stud 685, the latch is released from engagement with ledge 681 on the selector slide 670 whereupon the spring 680 moves the slide 670 to the left and slide 673 to the right, i.e., to the position shown in FIGURE 26, so that the fingers 682 and 683 reengage the cam stop hooks 674 by entering their notches 684 and the link 677 is in position to receive another qualifying signal from Bowden end 675.

It will be apparent, therefore, that unless another qualifying signal is received and transmitted by the Bowden end 675 to the link 677, the cam stop hooks 674, and therefore slide cams 650, will be restrained against movement to the right, as seen in FIGURES 18 to 23, with cam follower plates 655 at the beginning of the upstroke of the work operator 300. As a result, the rollers 653 on the cam follower plates 655 in their movement to the right will, due to their engagement with the angle slots 654, depress the slide cams 650 at the beginning of the upstroke, consequently also depressing reset links 647 and therefore cross keys 646 and 646a and reset bars 644.

Since there are spaces between the notches 636 and points 635 of the flippers 624 associated with the previously actuated set-up blanks 622 and the lift bars 629 carrying the notches 636 will not begin their upstroke until the rail blocks 640 make contact with the side rails 638 in the latter portion of the upstroke of the work operator, the early descent of the reset bars 644 gives the lower edges thereof an opportunity to engage the ledges 645 on actuated set-up blanks 622 and thereby to depress them before the associated flippers 624 are engaged by the notches 636. As the set-up blanks 622 are lowered by the reset bars 644 they are pivoted clockwise due to the cooperative action of slots 627 and studs 628, thus permitting the flippers 624 to rotate counterclockwise and out of the way of notches 636 due to movement to the right, as seen in FIGURES 27 to 29, of the bent ears 623 and the action of springs 633. As a result, all of the signals of the Bowden ends 631 are effectively nullified when a qualifying signal is not received by the way of Bowden end 675.

It is often desirable to operate the punch assembly without requiring a qualifying signal to be transmitted to it by way of Bowden ends 675 in order to punch cards in the manner signaled by Bowden ends 631. This can be accomplished by omitting the selector slides 670, 673 and associated parts, or by inserting a locking pin through the vertical slot in the selector slide 670 that is occupied by the bent finger 679 of the link 677 and threading it into a tapped hole 686 in the cross key 646, as shown best in FIGURE 24. It will readily be apparent that this procedure will lock the selector slides 670 and 673 in the position illustrated in FIGURE 25 so that the fingers 682 and 683 will not engage cam stop hooks 674 and thus permit slide cams 650 to move to the right with cam and follower plates 655 at the beginning of the upstroke of the work operator 300 before depressing reset links 647 and therefore reset bars 644.

These and other modifications of the machine embodying the invention, as well as other variations, applications and uses of the several subcombinations of the invention described will readily be apparent to those skilled in the art upon reading the description, and are intended to be included within the scope of the invention as set forth in the claims.

We claim:

1. In a machine of the class described, punching means comprising a frame carried below the card path at a work station and a die plate releasably mounted immediately above the card path at said station, said frame containing a plurality of vertically movable punches, each punch being pivotally engaged by an associated flipper having a lower end out of line in non-actuated position, with a flipper engaging notch on a lift bar, said flipper being slidably engaged by an associated signal-receptive set-up blank for pivoting the flipper into an actuated position in line with the flipper engaging notch upon actuation of the set-up blank by a punch signal, means for raising the lift bar for engaging the actuated flippers and driving the associated punches through a card and into the die plate, means for lowering actuated punches to a retracted position and disengaging the associated flippers from the notches in the lift bar, a reset bar for pushing actuated set-up blanks back into signal-receptive position, a quick reset mechanism responsive to a qualifying signal for delaying actuation of the reset bars until after the actuated flippers have been engaged by the notches in the life bar, means for actuating the quick reset mechanism, in the absence of a qualifying signal, to return punch signal-actuated flippers to their non-operative positions before engagement thereof by the notches in the lift bar, and means for inactivating the quick reset mechanism.

2. Punching means for a machine of the class described comprising a frame and a die plate, said frame containing a plurality of punches, signal-receptive means associated with each punch, reciprocable punch actuator means, means responsive to the signal-receptive means for engaging a punch with said punch actuating means, means for disengaging said punch after completion of a punch stroke, and reset means for returning the signal-receptive means to a signal-receptive condition wherein the reset means comprises first cam means movable toward and away from the die plate, second cam means actuatable by the first cam means for reciprocation transversely relative to the first cam means, third cam means actuatable by the second cam means for transverse reciprocation with the third cam means and for reverse reciprocation relative to the first cam means, reset bars actuatable for reciprocation toward and away from the die plate by said third cam means and means releasably locking the third cam means against transverse reciprocation, thereby making the third cam means and the reset bars movable away from the die plate when the first cam means begins its movement toward the die plate for releasing the responsive means from actuated signal-receptive means before engagement thereof by the reciprocable punch actuator means.

3. Punching means for a machine of the class described comprising a frame and a die plate, said frame containing a plurality of punches, signal-receptive means associated with each punch, reciprocable punch actuator means, means responsive to the signal-receptive means for engaging a punch with said punch actuating means, means for disengaging said punch after completion of a punch stroke, and reset means for returning the signal-receptive means to a signal-receptive condition wherein the reset means comprises first cam means movable toward and away from the die plate, second cam means actuatable by the first cam means for reciprocation transversely relative to the first cam means, third cam means actuatable by the second cam means for transverse reciprocation with the third cam means and for reverse reciprocation relative to the first cam means, reset bars actuatable for reciprocation toward and away from the die plate by said third cam means, means releasably locking the third cam means against transverse reciprocation, and means responsive to a special qualifying signal for inactivating said locking means, thereby delaying movement of the third cam means and the reset bars away from the die plate until after the first cam means begins its movement toward the die plate and after engagement of the responsive means with the reciprocable punch actuator means.

4. For a machine of the class described, a die plate adapted for support on rail members and over a card path, said die plate having lip members for juxtapositioning closely adjacent and inwardly of the rail members and for resilient camming engagement with plate members spring-biased in the rail members, a plurality of punches underlying the die plate, and means for controlling operation of the punches.

References Cited by the Examiner
UNITED STATES PATENTS

| | | | |
|---|---|---|---|
| 1,803,979 | 5/31 | Schaaff | 234—128 |
| 2,008,396 | 7/35 | Lasker | 234—128 |
| 2,451,752 | 10/48 | Lake et al. | 234—50 X |
| 2,566,931 | 9/51 | Cunningham et al. | 234—117 X |
| 2,800,182 | 7/57 | Hamilton et al. | 234—111 X |
| 2,848,048 | 8/58 | Parmenter | 234—114 |
| 2,862,555 | 12/58 | Jurgens et al. | 234—117 |
| 2,967,569 | 1/61 | Eden | 234—114 |

ANDREW R. JUHASZ, *Primary Examiner.*

J. SPENCER OVERHOLSER, *Examiner.*